(12) United States Patent
Su

(10) Patent No.: US 12,233,926 B2
(45) Date of Patent: Feb. 25, 2025

(54) FOLDABLE TROLLEY

(71) Applicant: Chung-Hsiu Su, Kaohsiung (TW)

(72) Inventor: Chung-Hsiu Su, Kaohsiung (TW)

( * ) Notice: Subject to any disclaimer, the term of this patent is extended or adjusted under 35 U.S.C. 154(b) by 331 days.

(21) Appl. No.: 17/845,549

(22) Filed: Jun. 21, 2022

(65) Prior Publication Data
US 2023/0406381 A1    Dec. 21, 2023

(51) Int. Cl.
*B62B 3/02*    (2006.01)
(52) U.S. Cl.
CPC .................................... *B62B 3/02* (2013.01)
(58) Field of Classification Search
CPC .. B62B 3/02; B62B 3/022; B62B 3/08; B62B 3/009
See application file for complete search history.

(56) References Cited

U.S. PATENT DOCUMENTS 9,150,233 B2 *  10/2015  Su ............................. B62B 1/12

* cited by examiner

*Primary Examiner* — James A Shriver, II
*Assistant Examiner* — Nicholas R. Kandas

(57) ABSTRACT

A foldable trolley includes a frame body unit and two wheel units. The frame body unit includes a lower frame structure and am upper frame structure. The upper frame structure includes a sliding rod slidably disposed on the lower frame structure. The upper frame structure is slidable in a direction toward a bottom of the lower frame structure, via sliding connection of the sliding rod and the lower frame structure, and fold on the lower frame structure, so as to convert the frame body unit from an unfolded state to a folded state. The wheel units are disposed respectively on two sides of the lower frame structure, and are operable to pivot toward the lower frame structure.

9 Claims, 8 Drawing Sheets

FOLDABLE TROLLEY

FIELD

This disclosure relates to a trolley, and more particularly to a foldable trolley.

BACKGROUND

A conventional load trolley disclosed in Taiwanese Patent No. M390258 includes a main frame body, two side frames, a positioning member, and two wheels respectively connected to lower ends of the side frames. The side frames are respectively pivoted to two sides of the main frame body. The positioning member is fixed between the side frames and is pivoted to the bottom end portion of the main frame body.

The positioning member is pivotable upward, so that the side frames are not blocked by the positioning member and can be operated to drive the wheels to pivot toward the main frame body to fold. Thus, the volume of the conventional load trolley can be reduced to facilitate storage of the conventional load trolley.

However, the main frame body of the conventional load trolley cannot be folded, so that the volume of the conventional load trolley when stored cannot be further reduced.

SUMMARY

Therefore, an objective of the present disclosure is to provide a foldable trolley that can alleviate at least one of the drawbacks associated with the abovementioned prior art.

According to the disclosure, a foldable trolley includes a frame body unit including a lower frame structure and an upper frame structure. The upper frame structure includes a sliding rod that is slidably disposed on the lower frame structure. The upper frame structure is slidable in a direction toward a bottom of the lower frame structure, via sliding connection of the sliding rod and the lower frame structure, and fold on the lower frame structure, so as to convert the frame body unit from an unfolded state to a folded state. The foldable trolley further includes two wheel units disposed respectively on two sides of the lower frame structure and operable to pivot toward the lower frame structure.

BRIEF DESCRIPTION OF THE DRAWINGS

Other features and effects related to the present disclosure will be clearly presented in the embodying manner with reference to the drawings, in which.

DETAILED DESCRIPTION

Figure 1:
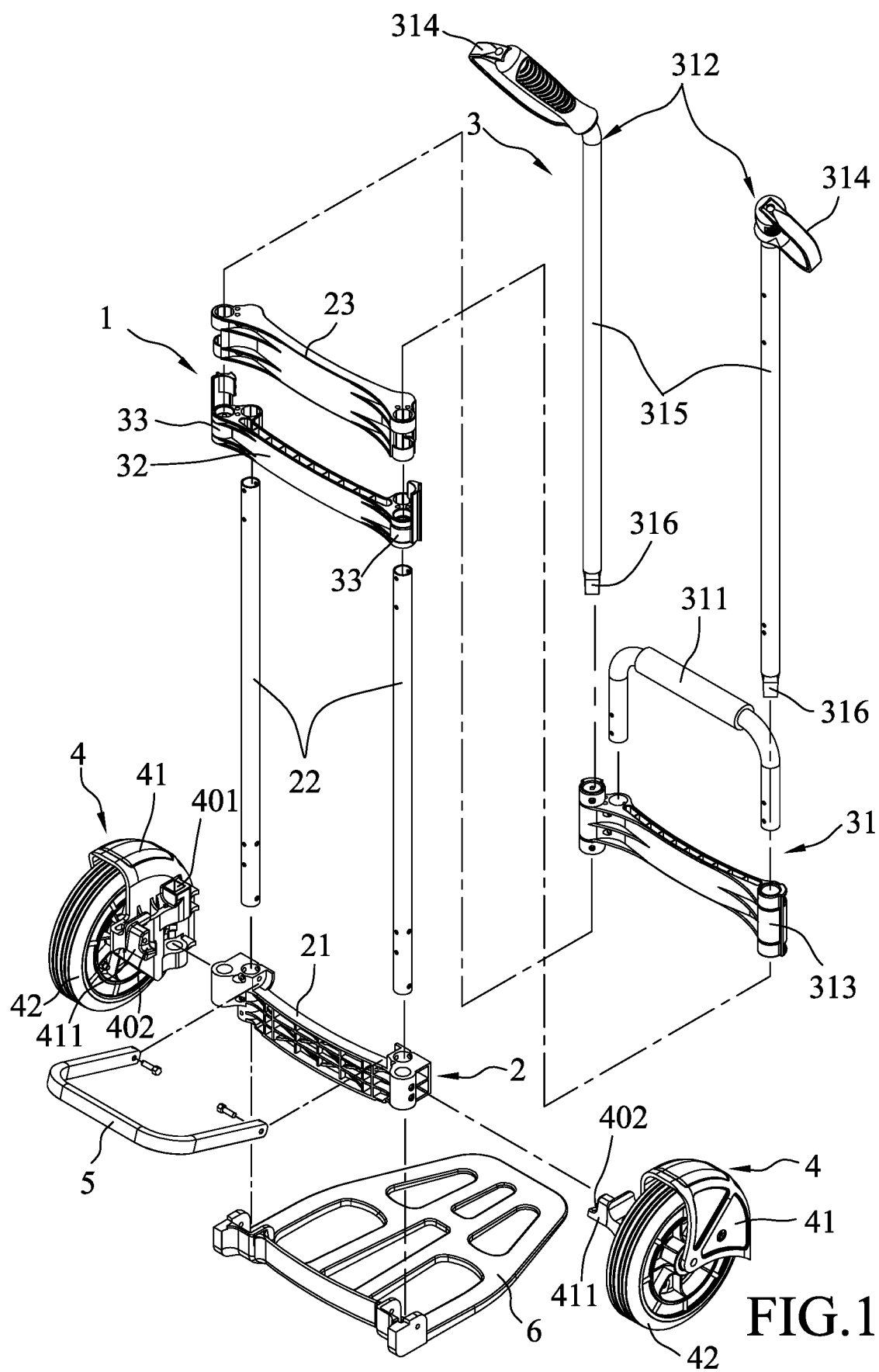
FIG. 1 is an exploded perspective view of an embodiment of the foldable trolley according to the disclosure.
Figure 2:
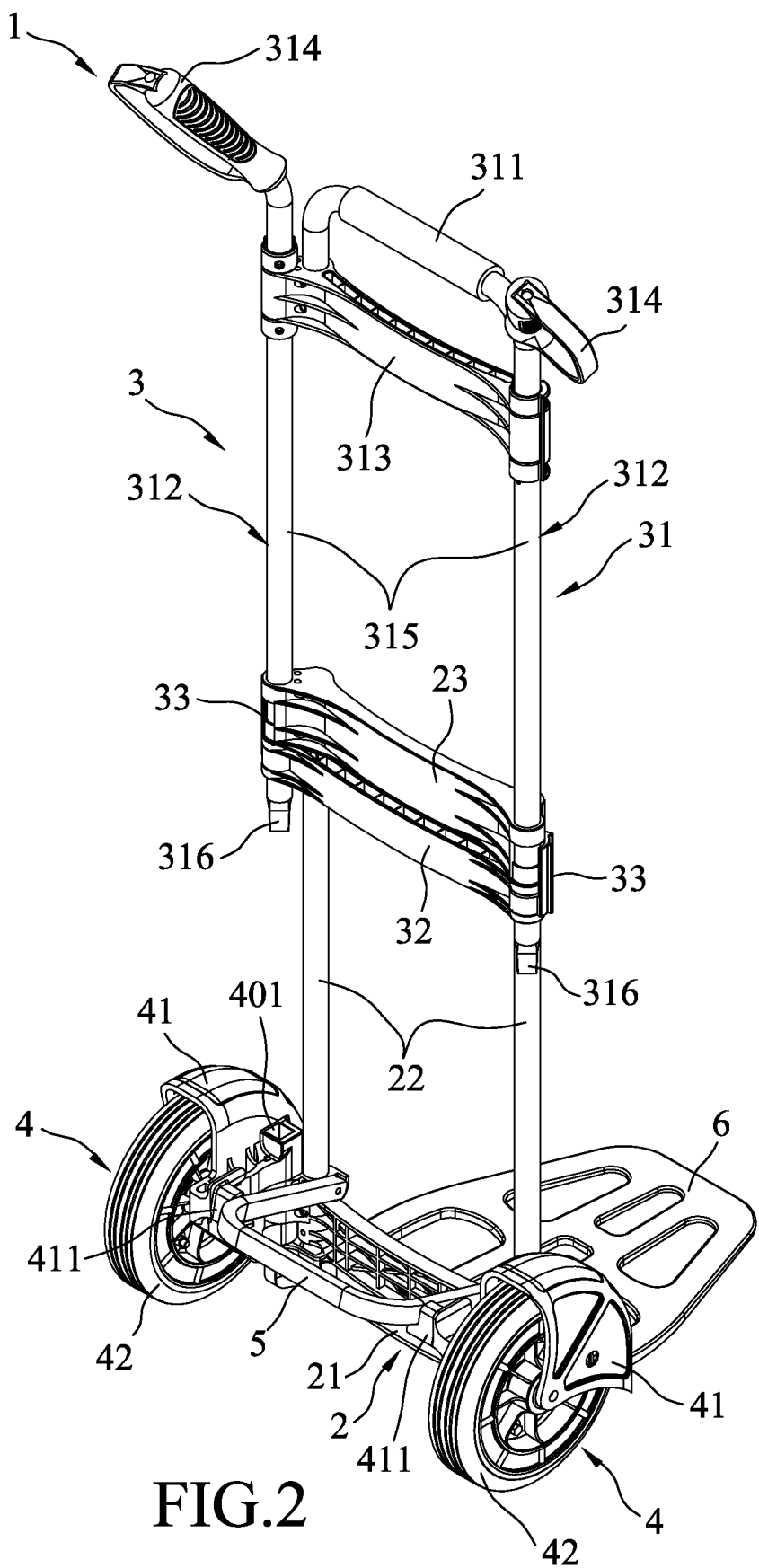
FIG. 2 is an assembled perspective view of the embodiment, illustrating a frame body unit in an unfolded state.
Figure 3:
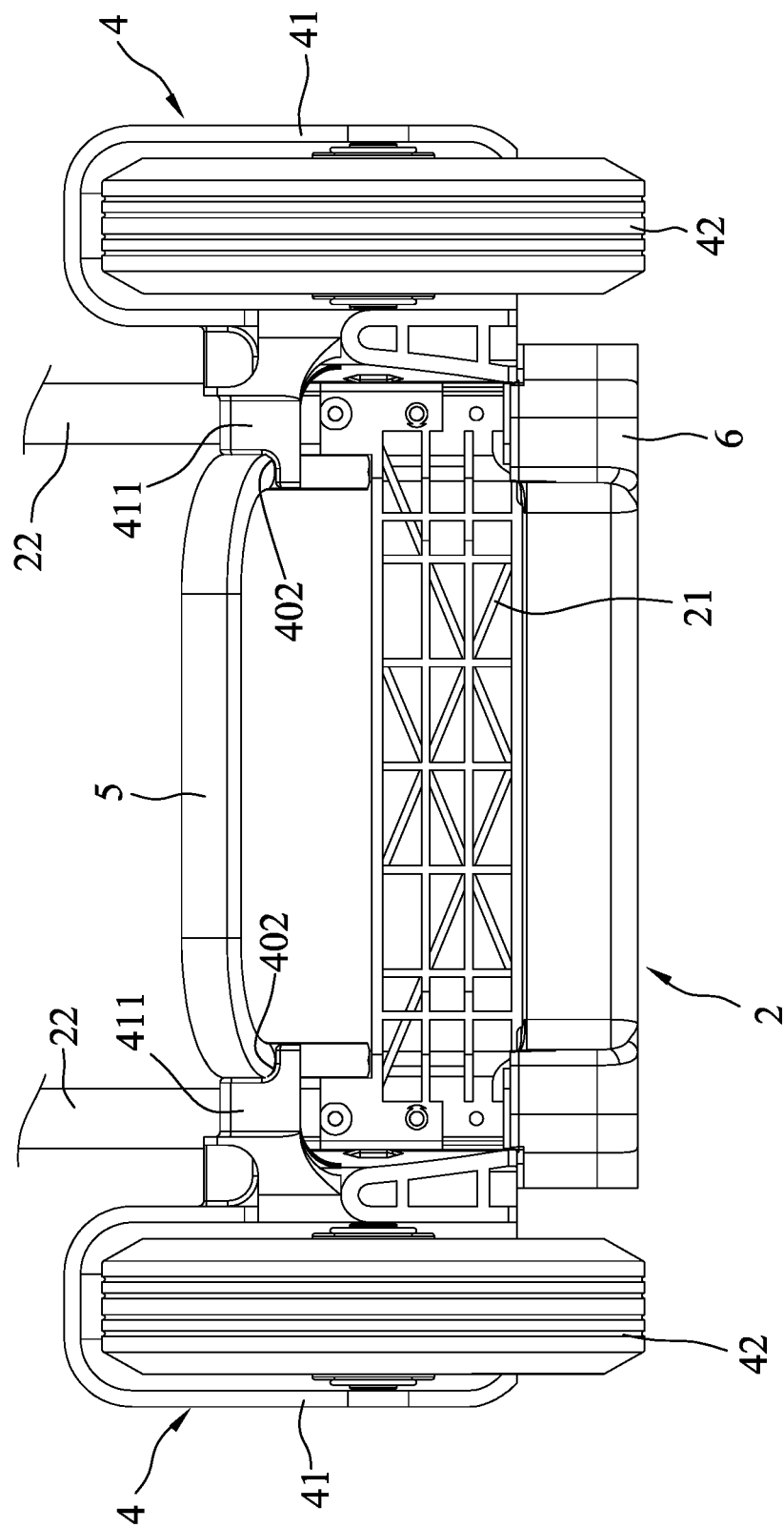
FIG. 3 is a fragmentary front view of the embodiment, illustrating a positioning member that laterally pushes against and is located between two positioning blocks.

Referring to FIGS. 1 to 3, an embodiment of a foldable trolley of the present disclosure includes a frame body unit 1, two wheel units 4, a positioning member 5, and a support plate 6. The frame body unit 1 includes a lower frame structure 2 and an upper frame structure 3, and is operable to switch between a unfolded state and a folded state.

The lower frame structure 2 includes a bottom seat 21, two lateral rods 22 disposed on the bottom seat 21, and a stationary rod 23. The stationary rod 23 is connected between the lateral rods 22.

Each wheel unit 4 includes a wheel seat 41 and a wheel 42. The wheel seats 41 of the wheel units 4 are respectively and pivotally connected to two sides of the bottom seat 21, and are operable to pivot toward the bottom seat 21 for folding. The wheels 42 of the wheel units 4 are respectively and rotatably mounted on the wheel seats 41 of the wheel units 4. The wheel seat 41 of each wheel unit 4 has an engaging hole 401, such as but not limited to a rectangular hole. The wheel seat 41 of each wheel unit 4 further has a positioning block 411 that is located at the inner side of the wheel seat 41 and that has a recess 402.

The positioning member 5 is generally U-shaped in appearance, and has two ends that are pivoted to the bottom seat 21. The positioning member 5 is operable to laterally push against and disposed between the positioning blocks 411 of the wheel seats 41 of the wheel units 4, so as to prevent the wheel units 4 from pivoting toward the positioning member 5 during use. The positioning member 5 is further operable to pivot upward to a position not blocking the positioning blocks 411 so as to allow the positioning blocks 411 to pivot toward the lateral rods 22. The support plate 6 is pivoted to the bottom seat 21 and is pivotable towards the lateral rods 22.

The upper frame structure 3 has a main frame body 31, a sliding rod 32 mounted to the main frame body 31, and two engaging rings 33. The main frame body 31 includes a handle portion 311, two side frame portions 312 respectively disposed on two ends of the handle portion 311, and a connecting rod 313 fixed between the handle portion 311 and the side frame portions 312.

The side frame portions 312 extend fixedly through the sliding rod 32. The sliding rod 32 is slidably sleeved on the lateral rods 22 of the lower frame structure 2. Each side frame portion 312 has a grip segment 314 permitting a user to hold the operation, an extending segment 315, and a pin segment 316 extending downwardly from the extending segment 315. The pin segments 316 of the side frame portions 312 correspond in shape to that of the engaging holes 401 of the wheel seats 41, so that pin segments 316 can be non-rotatably and respectively inserted into the engaging holes 401. Each pin segment 316 is, for example, but not limited to, rectangular.

Figure 4:
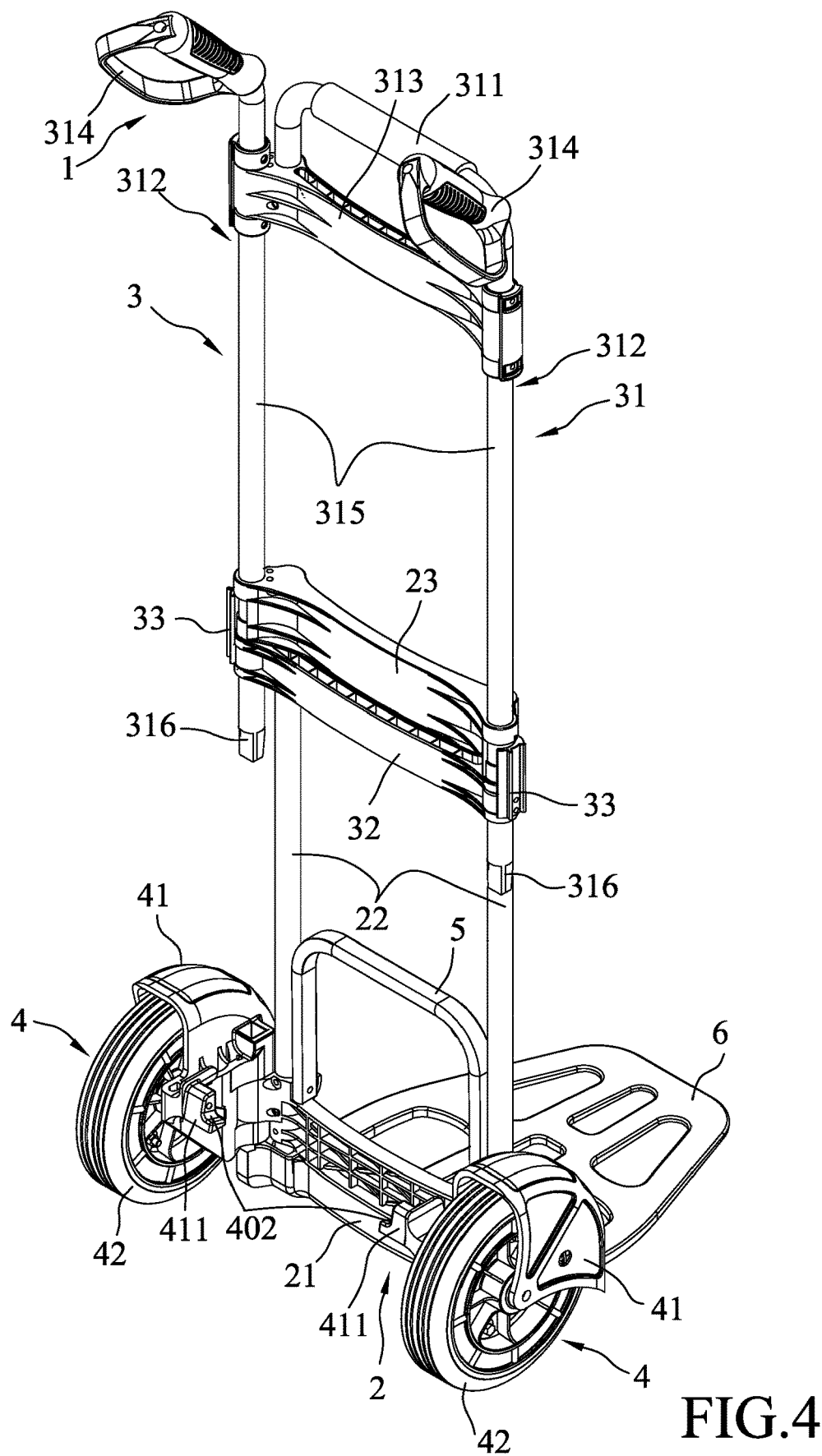
FIG. 4 is a view similar to FIG. 2, but illustrating the positioning member being pivoted upward to a position not blocking the positioning blocks.
Figure 5:
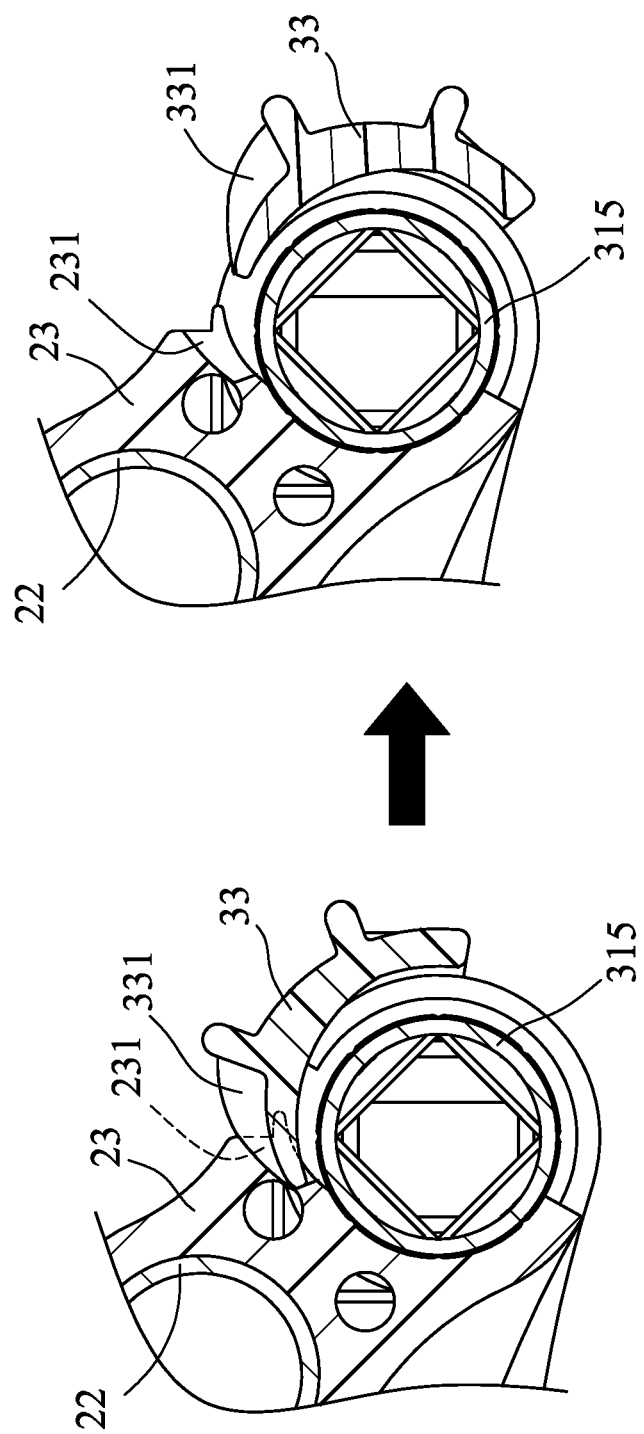
FIG. 5 is a fragmentary sectional view of the embodiment, illustrating that an engaging ring is operable to be disengaged from a stationary rod.

The stationary rod 23 is located above the sliding rod 32. Referring to FIGS. 4 and 5, the stationary rod 23 is provided with a plurality of first engaging members 231. The engaging rings 33 are respectively disposed on the extending segments 315 of the side frame portions 312, and are respectively driven by the side frame portions 312 to rotate relative to the stationary rod 23. Each engaging ring 33 is provided with a plurality of second engaging members 331. The second engaging members 331 of the engaging rings 33 are engageable with the first engaging members 231 of the stationary rod 23.

In this embodiment, each of the first engaging members 231 is a groove, and each of the second engaging members 331 is a protrusion. However, in other embodiments of the present disclosure, each of the first engaging members 231 may be a protrusion, and each of the second engaging members 331 may be a groove.

When the embodiment is in use, The frame body unit 1 is in the unfolded state (see FIG. 2) and the first engaging members 231 of the stationary rod 23 are engaged respectively with the second engaging members 331 of the engaging rings 33, so as to secure the frame body unit 1 in the unfolded state and prevent sliding movement of the upper frame structure 3 relative to the lower frame structure 2. Further, the positioning member 5 laterally pushes against the positioning blocks 411 and engages with the recesses 402 of the positioning blocks 411 so as to prevent the wheel units 4 from pivoting and folding.

Figure 6:
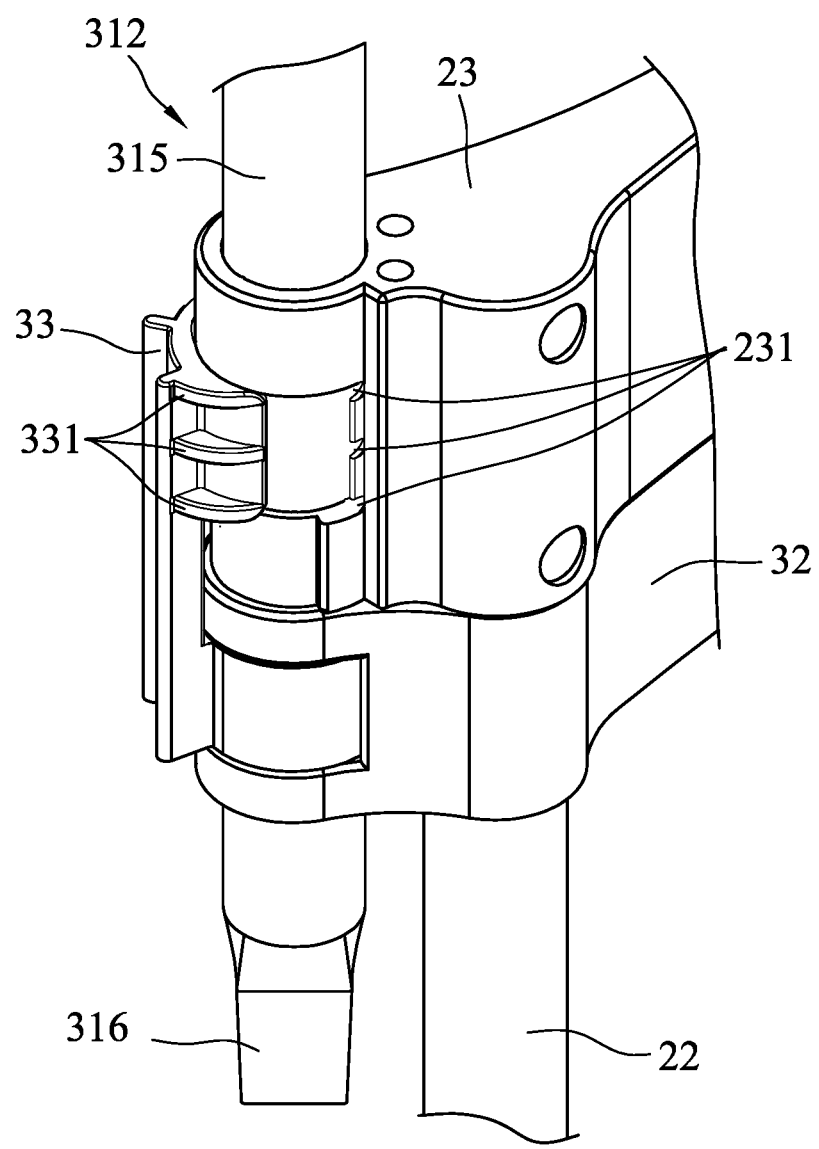
FIG. 6 is an enlarged fragmentary perspective view of the embodiment, illustrating that the engaging ring is disengaged from the stationary rod.

Referring to FIGS. 4 to 6, when it is desired to store the embodiment, the user first pivots the positioning member 5 upward to a position folding with the lateral rods 22 and not blocking the positioning blocks 411. Then, the user further operates the grip segments 314 of the side frame portions 312 to rotate the side frame portions 312 and the engaging rings 33, and so that the second engaging members 331 of the engaging rings 33 are disengaged from the first engaging members 231 of the stationary rod 23.

Figure 7:
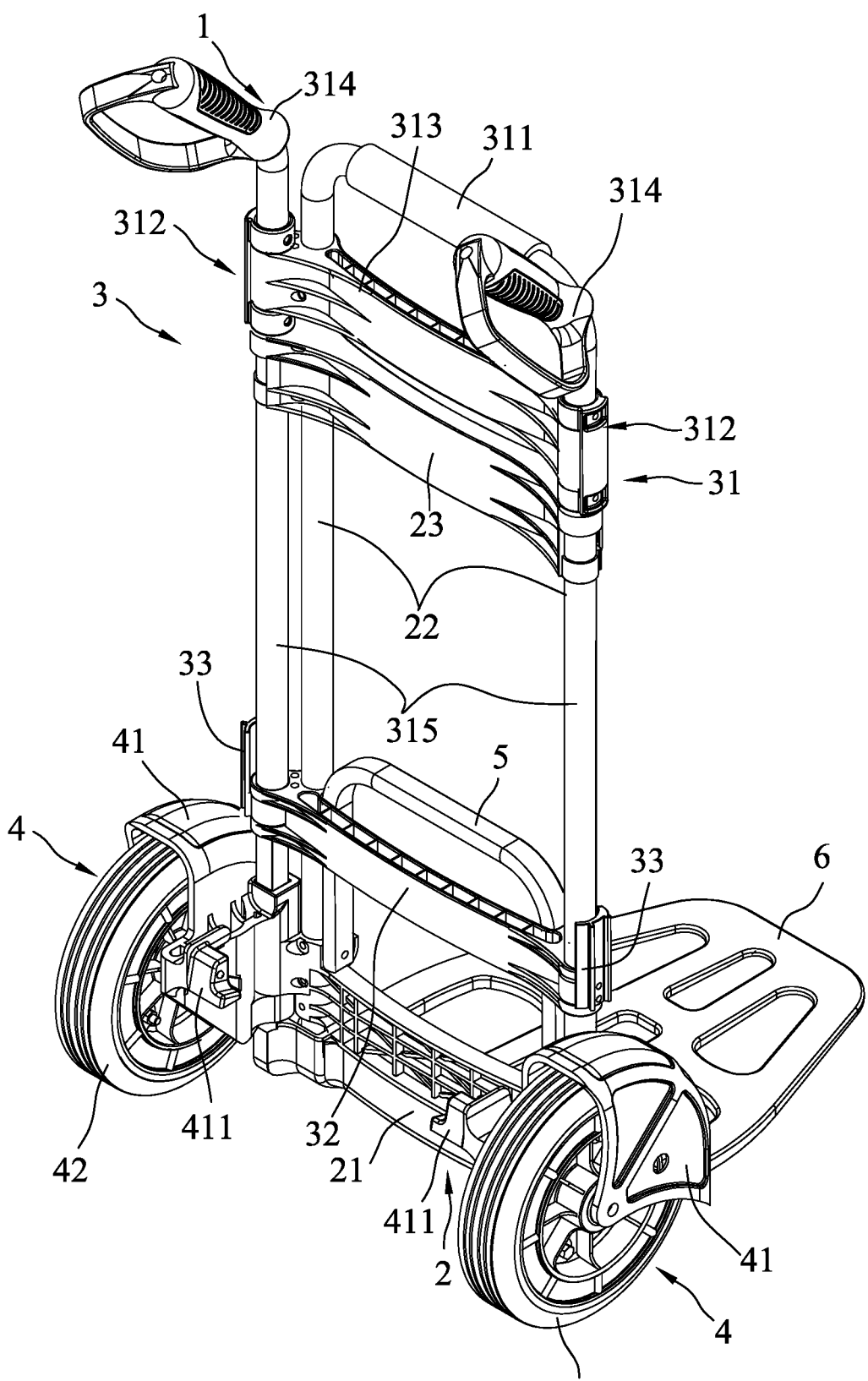
FIG. 7 is another assembled perspective view of the embodiment, illustrating the frame body unit in a folded state.

Next, with reference to FIG. 7, the user holds the grip segments 314 and presses, so that the upper frame structure 3 slides in a direction toward the bottom seat 21, via sliding connection of the sliding rod 32 and the lateral rods 22 and is retained on the lower frame structure 2, and fold on the lower frame structure 2, so as to convert the frame body unit 1 from the unfolded state to the folded state. At this time, the pin segments 316 of the side frame portions 312 are respectively and non-rotatably inserted into the engaging holes 401 of the wheel seats 41.

Figure 8:
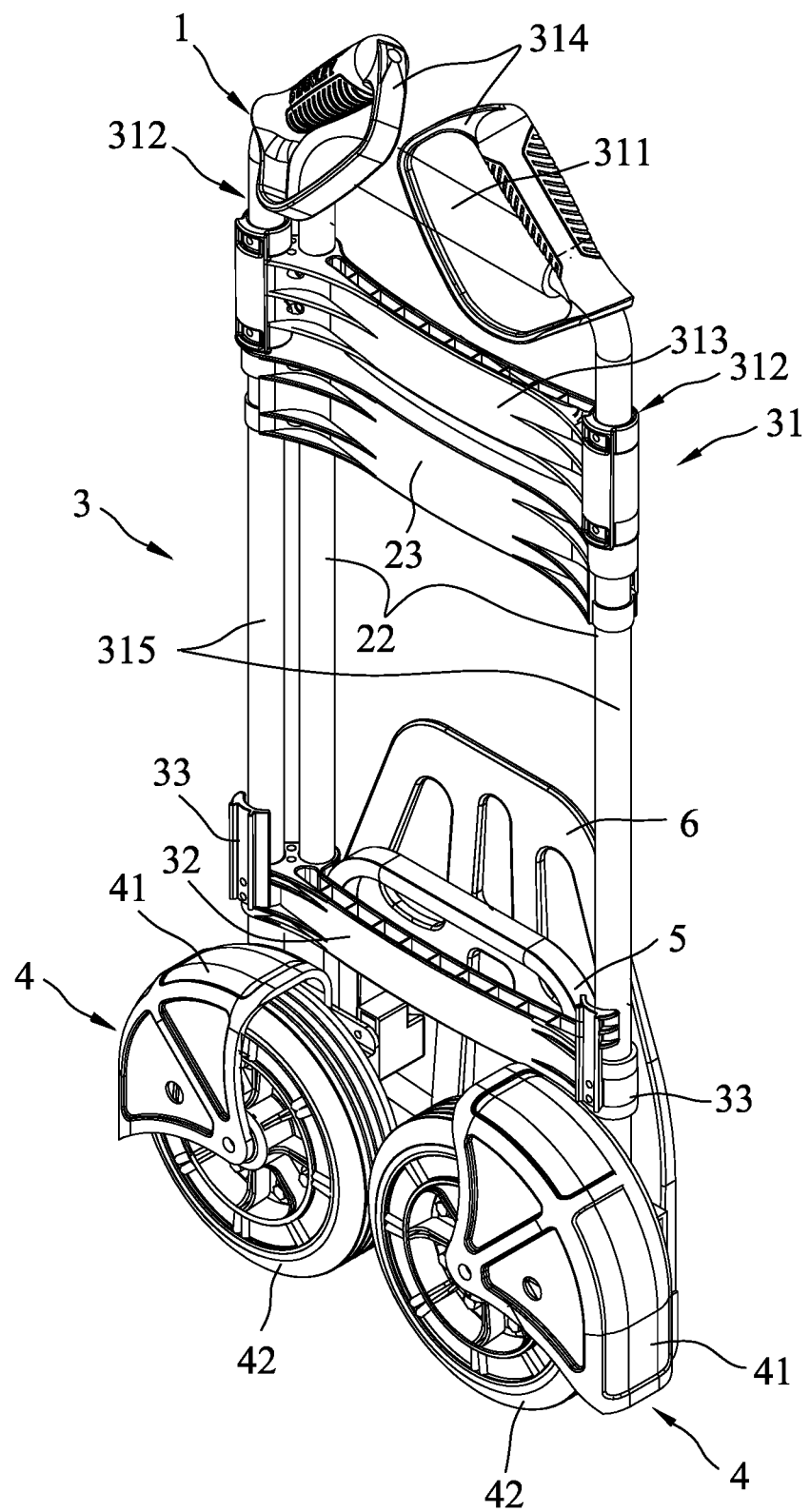
FIG. 8 is a perspective view of the embodiment when it is fully folded.

Next, with reference to FIG. 8, the grip segments 314 are operated to rotate toward each other to drive the wheel units 4 to pivot toward the bottom seat 21, and finally drive the support plate 6 to pivot toward the lateral rods 22 to contact the lateral rods 22, so that the foldable trolley is completely folded and has a minimum storage volume.

In summary, by virtue of the upper frame structure 3 and the lower frame structures 2, the frame body unit 1 can be operated to convert from the unfolded state to the folded state so as to reduce the volume of the foldable trolley. Furthermore, the support plate 6 is rotatable to contact the lateral rods 22, thus the foldable trolley is stored at a minimum storage volume. Hence, the foldable trolley has an advantage of simple operation and convenient storage, and can indeed achieve the object of this disclosure.

However, the above is merely an embodiment of the present disclosure, and certainly the scope of practicing the present disclosure cannot be limited thereby. Any simple equivalent variation and modification made according to the claims of the present disclosure and the patent specification should fall within the scope covered by a patent to the present disclosure.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A foldable trolley comprising:
    a frame body unit including a lower frame structure and an upper frame structure, said upper frame structure including a sliding rod that is slidably disposed on said lower frame structure, said upper frame structure being slidable in a direction toward a bottom of said lower frame structure, via sliding connection of said sliding rod and said lower frame structures, and fold on said lower frame structure, so as to convert said frame body unit from an unfolded state to a folded state; and
    two wheel units disposed respectively on two sides of said lower frame structure and operable to pivot toward said lower frame structure;
    wherein said lower frame structure includes a bottom seat, two lateral rods, and a stationary rod connected between said lateral rods, said upper frame structure further including a main frame body and two engaging rings, said main frame body having a handle portion and two side frame portions, said engaging rings being disposed respectively on said side frame portions, said engaging rings being engaged to said stationary rod when said frame body unit is in said unfolded state, and being driven respectively and rotatably by said side frame portions to disengage from said stationary rod to thereby allow conversion of said frame body unit from said unfolded state to said folded state.

2. The foldable trolley as claimed in claim 1, wherein said side frame portions extend fixedly through said sliding rod, said sliding rod being slidably sleeved on said lateral rods.

3. The foldable trolley as claimed in claim 1, wherein said stationary rod is provided with a plurality of first engaging members, each engaging ring being provided with a plurality of second engaging members, said second engaging members of said engaging rings being engageable with said first engaging members of said stationary rod to secure said frame body unit in said unfolded state.

4. The trolley as claimed in claim 3, wherein one of each first engaging member and each second engaging member is a protrusion, and the other one of each first engaging member and each second engaging member is a groove.

5. The foldable trolley as claimed in claim 1, wherein each of said side frame portions has a grip segment, an extending segment, and a pin segment, each of said wheel units being pivoted to said bottom seat and having an engaging hole, said pin segments of said side frame portions being non-rotatably and respectively inserted into said engaging holes of said wheel units when said frame body unit is in said folded state.

6. The trolley as claimed in claim 5, wherein, when said frame body unit is in said folded state, said grip segments of said side frame portions are operable to drive said wheel units to pivot toward said bottom seat through said pin segments.

7. The foldable trolley as claimed in claim 5, wherein said pin segment of each side frame portion is rectangular and said engaging hole of each wheel unit is a rectangular hole.

8. The foldable trolley as claimed in claim 1, wherein:
   said foldable trolley further comprises a positioning member pivoted to said bottom seat;
   each of said wheel units has a positioning block located at an inner side of said wheel unit; and
   said positioning member is operable to laterally push against and located between said positioning blocks of said wheel units and is further operable to pivot upward to a position not blocking said positioning blocks.

9. The foldable trolley as claimed in claim 1, further comprising a support plate pivoted to said bottom seat.

* * * * *